United States Patent Office 2,995,530
Patented Aug. 8, 1961

2,995,530
POLYURETHANE COMPOSITION CONTAINING AN N,N'-BIS(HYDROXY-ALKYL) PIPERAZINE AND PREPARATION OF SAME
Kurt C. Frisch, Grosse Ile, and Walter F. Schulz, Ecorse Township, Mich., assignors to Wyandotte Chemicals Corporation, Wyandotte, Mich., a corporation of Michigan
No Drawing. Filed June 4, 1958, Ser. No. 739,673
14 Claims. (Cl. 260—2.5)

This invention relates to polyurethane compositions. More especially, it relates to polyurethane compositions containing a catalyst or accelerator.

Polyurethane products are usually obtained by reacting a polyisocyanate with an active hydrogen-containing organic compound such as a hydroxy-terminated polyester, a polyesteramide, or a dihydric polyether.

In manufacturing foamed articles such as cushions, crash pads, and foamed-in-place insulation it is the usual practice to carry out the reaction with an excess of polyisocyanate and with a small quantity of water, which is either added as the last step in the reaction or simultaneously with all the other reactants, depending on the method of manufacture used.

In the "prepolymer" method of manufacturing foamed articles the polyisocyanate in stoichiometric excess is first reacted with an active hydrogen-containing, high molecular weight organic compound whereby a "prepolymer" is formed. The "prepolymer" and water are then mixed together whereupon the "prepolymer" polymerizes and cross-links while excess polyisocyanate and water react to produce carbon dioxide gas.

In the "one-shot" method of manufacture, usually used in making foamed-in-place articles, the reactants are mixed together all at once; and the resultant mixture is immediately injected or poured into a mold or form. In one variation of this method, the "pre-mix" method, an active hydrogen-containing, high molecular weight organic compound, the water, and other materials are first mixed together and then mixed with the appropriate amount of the polyisocyanate.

Regardless of the method used, it is necessary in manufacturing foamed articles that the polymerization and $CO_2$ release come to a stop at approximately the same time. If the foam "sets" before all the $CO_2$ has been released, the foam may scorch due to excessive heat build-up and the higher density of the reaction product. On the other hand, if the release of $CO_2$ is completed before the foam "sets," the foam may shrink or even collapse. Usually, it is the latter case that prevails, i.e., the rate of polymerization and cross-linking is slower than the rate of reaction of excess polyisocyanate with water and thus the rate of $CO_2$ release.

Consequently, it is the practice of the art to introduce into the polyurethane foam reaction system a catalyst or accelerator to hasten the polymerization and cross-linking reaction.

In general, the prior art has used tertiary amines as catalysts for this purpose, the more conventional ones being, for example, N-methylmorpholine and triethylamine.

Usually it is preferred that the catalyst be water-soluble in order that it can be well dispersed throughout the reaction mass at the time of reaction. If the catalyst is not water-soluble, then in order to obtain good dispersion it is usually necessary that an emulsifier be present and that the catalyst be well dispersed in the water added to the other reactants.

The water-soluble, prior art catalysts as a class, however, suffer from one defect. These catalysts are possessed with disagreeable and obnoxious odors which not only emanate during the manufacture of the foamed composition but also to an objectionable degree from the final product. When it is considered that big fields of applications of polyurethane foams are cushions and mattresses and foamed-in-place insulation for refrigerators and the like, it can readily be appreciated that this property of odor is one of practical significance.

Accordingly, it is an object of this invention to provide a polyurethane foam composition that is substantially odor-free. More especially, it is an object of this invention to produce a polyurethane foam composition with a water-soluble catalyst which in and of itself is substantially free of obnoxious odor and which does not impart an obnoxious odor to the polyurethane foam product.

These and other objects which may appear as this specification proceeds are attained by this invention.

In summary, this invention comprises incorporating an N,N'-bis(hydroxyalkyl)piperazine as a catalyst in polyurethane reactions and compositions.

The catalyst of this invention conforms to the following structural formula:

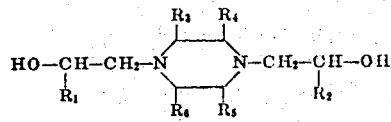

wherein $R_1$ and $R_2$ are hydrogen, alkyl aryl, and alkylaryl and $R_3$, $R_4$, $R_5$ and $R_6$ are hydrogen, alkyl, aryl, and alkylaryl. Specific examples of compounds conforming to this structural formula are N,N'-bis(2-hydroxyethyl)-piperazine, N,N'-bis(2-hydroxyethyl)2-methylpiperazine, N,N'-bis(2-hydroxyethyl)2,5-dimethylpiperazine and the N,N'-bis(2-hydroxypropyl) derivatives of piperazine, 2-methylpiperazine and 2,5-dimethylpiperazine and mixtures thereof. This class of catalysts conforming to the structural formula is characterized by high water solubility and by little or no obnoxious odor either per se or in polyurethane compositions.

The catalyst of this invention may be used in the manufacture of polyurethane foams regardless of the particular method used. Thus, in the "one-shot" foam production method, it may be introduced simultaneously with the active hydrogen-containing, high molecular weight organic compound, the polyisocyanate and the water. In the "pre-mix" variation of this method, the catalyst, being water-soluble, may be dissolved in the water and mixed with the reactive hydrogen-containing, high molecular weight organic compound prior to addition of the polyisocyanate. In the prepolymer method, it may be added with the water to the polyisocyanate-modified, active hydrogen-containing, high molecular weight organic compound; or it may be added to the prepolymer prior to the addition of the water.

The quantity of catalyst used in the reaction depends on the reactants and quantities of reactants used and on the degree of tackiness desired in the end product. For polyurethane foams in general the catalytic quantity is generally in the range of 0.25 to 5.0 parts per 100 parts of polyisocyanate and reactive hydrogen-containing, high molecular weight organic compound.

The catalyst may be used in its pure state or as commercially produced in which case there may be present a small concentration of secondary amine, but this does not render ineffective as catalysts the compounds conforming to the structural formula although the level of odor may be somewhat higher. Such level, however, may be tolerated under certain conditions.

The compounds of the class conforming to the structural formula can be used as catalysts with any of the prior art, reactive hydrogen-containing organic compounds such as, for example, polyesters, polyisocyanate-modified polyesters, polyesteramides, polyisocyanate-modified polyesteramides, high molecular weight polyols (polyalcohols), polyisocyanate-modified high molecular weight polyols, polyether alcohols and polyisocyanate-modified polyether alcohols, polythioether alcohols and polyisocyanate-modified polythioether alcohols having free reactive hydrogen atoms, free reactive carboxylic groups and/or especially hydroxyl groups.

The polyesters and/or polyesteramides may include those obtained by condensing any polybasic (preferably dibasic carboxylic) organic acid such as adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, and itaconic acids with polyalcohols such as ethylene glycol, diethylene glycol, pentaglycol, glycerol, sorbitol, triethanolamine, and di-(β-hydroxyethyl)ether and/or amino alcohols such as ethanolamine, 3-aminopropanol, 4-aminopropanol, 5-aminopentanol-1, 6-aminohexanol, 10-aminodecanol, 6-amino-5-methylhexanol-1, and p-hydroxymethylbenzylamine, and with mixtures of the foregoing polyalcohols and amines (ethylene diamine, hexamethylene diamine, 3-methylhexamethylene diamine, decamethylene diamine and m-phenylene diamine) and/or amino-alcohols, the mol ratios preferably being such as to provide terminal hydroxyl radicals. In the esterification of the polyalcohols, the acid per se may be used for condensation; or, where desirable, equivalent components such as the acid halide or anhydride may be used.

The polyols and the polyether alcohols used in the practice of this invention may comprise ethylene glycol, propylene glycol, butylene glycol-2,3, butylene glycol-1,3, 2-methylpentenediol-2,4, 2-ethylhexanediol-1,3, hexamethylene glycol, styrene glycol and decamethylene glycol and diethylene glycol, triethylene glycol, tetraethylene glycol, polyethylene glycols 200, 400 and 600, dipropylene glycol, tripropylene glycol, polypropylene glycols 400, 750, 1200, and 2,000, and conjugated polyoxyethylene polyoxypropylene glycol derivatives of ethylene diamine and polyhydric alcohols, wherein the average molecular weight of the polyoxypropylene is at least about 900.

The N,N'-bis(hydroxyalkyl)piperazines function as effective catalysts in conjunction with any of the prior art polyisocyanates such as, for example, ethylene diisocyanate, ethylidene diisocyanate, propylene-1,2-diisocyanate, butylene-1,3-diisocyanate, hexylene-1,6-diisocyanate, cyclohexylene-1,2-diisocyanate, hexamethylene diisocyanate, m-phenylene diisocyanate, bis(toluene diisocyanate), bis(phenyl)methylene diisocyanate, bis(anisidyl diisocyanate), 2,4-toluene diisocyanate, 2,6-toluene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate and polyisocyanates in a blocked or inactive form such as the bis-phenylcarbamates of toluene diisocyanate, p,p'-diphenylmethane diisocyanate, p-phenylene diisocyanate and 1,5-naphthalene diisocyanate.

The N,N'-bis(hydroxyalkyl)piperazines can likewise be used in polyurethane reactions in conjunction with various cross-linking agents used to control the rigidity of the product, such as, for example, besides water, polyalcohols such as ethylene glycol, propylene glycol, butylene glycol, diethylene glycol, triethylene glycol, glycerol, and trimethylol propane.

An outstanding property of the N,N'-bis(hydroxyalkyl)-piperazines of this invention is the ability of the two hydroxyl groups in the molecule thereof to react with excess polyisocyanate in the reaction mixture. This further assists in reducing the obnoxious odor level of the final product.

The catalysts of this invention have another feature in that they tend to give slow gelation rates to the urethane reaction mass. This is an advantage in fabricating molded articles where a substantial amount of flow of the mixed foam composition in the mold is required before the foam is cured. Still another feature of advantage of the water-soluble catalysts of this invention is that they tend to give softer foams than conventional catalysts.

The catalysts of this invention are not only useful in the manufacture of foamed polyurethane products but also in the manufacture of polyurethane compositions useful as films, adhesives, rubber, potting compounds, and molding compounds.

Specific examples to illustrate this invention are set forth as follows.

Example 1

This example illustrates the preparation in accordance with this invention of essentially odor-free crash pads particularly suitable for use in automobiles.

A prepolymer was prepared by mixing 100 parts by weight of a conjugated polyoxypropylene polyoxyethylene glycol, in each molecule of which the molecular weight of the polyoxypropylene present was about 2000 and the weight percent of ethylene oxide was about 13, with 58 parts by weight of a mixture of 80% by weight of 2,4-toluene diisocyanate and 20% by weight of 2,6-toluene diisocyanate, and heating to 60° C. Six parts by weight of trimethylol propane were then added, and the resulting mixture was agitated for 4 hours at a temperature of 80° C. At the end of this time the mixture of prepolymer had a final viscosity of 7600 c.p.s. at 25° C, and a free NCO concentration of 10.55% by weight.

The prepolymer was then cooled to room temperature and predetermined amounts representing 100 parts by weight were transferred into mixing cups. To each cup was added 0.4 part by weight of a bubble size-controlling agent (a silicone oil [dimethylsiloxane polymer] marketed as Silicone DC-200 (50 cps.)) which was thoroughly mixed into the prepolymer by means of a propeller-type stirrer operated at approximately 1,000 r.p.m. There were then added to each mixing cup 2.50 parts by weight of water and 1.3 parts by weight of a catalyst according to this invention, which had been previously mixed together whereby an aqueous solution was formed; and stirring was continued until the mixture in each cup began to foam (approximately 30 seconds in each case). After the foam in each case had risen to its full height, it was placed into an oven at 70° C. and cured for 1 hour. The foam was then removed from the oven, lightly crushed and placed back into the oven for a final cure.

In one case the catalyst was N,N'-bis(hydroxyethyl)-2-methylpiperazine (Catalyst No. 1) while in another case the catalyst was N,N'-bis(2-hydroxypropyl)-2-methylpiperazine (Catalyst No. 2).

Measurements made on the resultant foam articles gave the following data:

| | Catalyst No. 1 | Catalyst No. 2 |
|---|---|---|
| Tensile strength (p.s.i.) | 25.3 | 23.0 |
| 100% modulus (p.s.i.) | 19.6 | 16.8 |
| Elongation (percent) | 190 | 183 |
| Tear resistance (p. l.) | 4.2 | 3.3 |
| 25% deflection load (p.s.i.) | 2.21 | 2.07 |
| 50% deflection load (p.s.i.) | 4.54 | 4.12 |
| 75% deflection load (p.s.i.) | 16.46 | 11.25 |
| Compression set (percent) [1] | 39.05 | 39.3 |
| Density, pounds/cubic foot | 2.85 | 2.45 |

[1] S.P.I. method A.

The foam in each case was substantially odor-free.

What is claimed is:
1. An odorless polyurethane composition comprising the reaction product of a monomeric organic polyisocyanate, an active hydrogen-containing organic compound selected from the group consisting of (a) polyesters which are the reaction product of a polyhydric alcohol and a member selected from the group consisting of polycarboxylic acids, anhydrides, and acid halides, (b) polyesteramides which are the reaction product of a polycarboxylic acid and a member selected from the group consisting of aminoalcohols, a polyhydric alcohol plus an amine, a polyhydric alcohol plus an aminoalcohol, and a polyhydric alcohol plus an amine plus an aminoalcohol, and (c) polyhydric alcohols, and between about 0.25 and about five parts, per 100 parts of polyisocyanate and reactive hydrogen-containing organic compound, of an N,N'-bis(hydroxyalkyl)-piperazine, wherein the N,N'-bis(hydroxyalkyl)piperazine has the following structural formula:

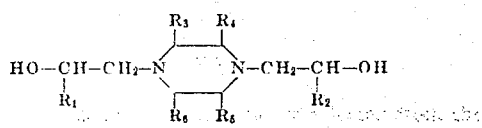

wherein $R_1$, $R_2$, $R_3$, $R_4$, $R_5$, and $R_6$ are selected from the group consisting of hydrogen and alkyl.

2. An odorless polyurethane foam composition comprising the reaction product of a monomeric organic polyisocyanate, an active hydrogen-containing compound selected from the group consisting of (a) polyesters which are the reaction product of a polyhydric alcohol and a member selected from the group consisting of polycarboxylic acids, anhydrides, and acid halides, (b) polyesteramides which are the reaction product of a polycarboxylic acid and a member selected from the group consisting of aminoalcohols, a polyhydric alcohol plus an amine, a polyhydric alcohol plus an aminoalcohol, and a polyhydric alcohol plus an amine plus an aminoalcohol, and (c) polyhydric alcohols, water and between about 0.25 and 5 parts, per 100 parts of polyisocyanate and reactive hydrogen-containing organic compound, of a water-soluble, N,N'-bis(hydroxyalkyl)piperazine, wherein the N,N'-bis(hydroxyalkyl)piperazine has the following structural formula:

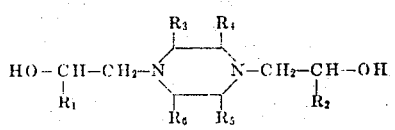

wherein $R_1$, $R_2$, $R_3$, $R_4$, $R_5$, and $R_6$ are selected from the group consisting of hydrogen and alkyl.

3. An odorless polyurethane foam composition according to claim 2 wherein said N,N'-bis(hydroxyalkyl)piperazine is an N,N'-bis(hydroxyalkyl)2-methylpiperazine.

4. An odorless polyurethane foam composition according to claim 2 wherein said N,N'-bis(hydroxyalkyl)piperazine is an N,N'-bis(hydroxyalkyl)2,5-dimethylpiperazine.

5. An odorless polyurethane foam composition according to claim 2 wherein said N,N'-bis(hydroxyalkyl)piperazine is an N,N'-bis(2-hydroxyethyl)piperazine.

6. An odorless polyurethane foam composition according to claim 2 wherein said N,N'-bis(hydroxyalkyl)piperazine is an N,N'-bis(2-hydroxypropyl)piperazine.

7. An odorless polyurethane foam composition comprising the reaction product of toluene diisocyanate, a polyether having terminal hydroxy groups, water, and between about 0.25 and 5 parts, per 100 parts of toluene diisocyanate and polyetherpolyol, of a water-soluble N,N'-bis(2-hydroxyalkyl)piperazine, wherein the N,N'-bis(hydroxyalkyl)piperazine has the following structural formula:

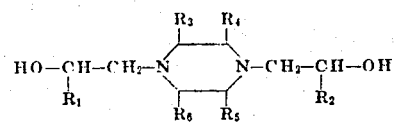

wherein $R_1$, $R_2$, $R_3$, $R_4$, $R_5$, and $R_6$ are selected from the group consisting of hydrogen and alkyl.

8. An odorless polyurethane composition according to claim 7 wherein said N,N'-bis(2-hydroxyalkyl)piperazine is N,N'-bis(2-hydroxyethyl)2-methylpiperazine.

9. An odorless polyurethane composition according to claim 7 wherein said N,N'-bis(2-hydroxyalkyl)piperazine is N,N'-bis(2-hydroxypropyl)2-methylpiperazine.

10. An odorless polyurethane foam composition comprising the reaction product of a polyurethane prepolymer having a free —NCO content, water, and between about 0.25 and about 5 parts, per 100 parts of polyurethane prepolymer, of a water-soluble N,N'-bis(2-hydroxyalkyl)piperazine, wherein the N,N'-bis(hydroxyalkyl)piperazine has the following structural formula:

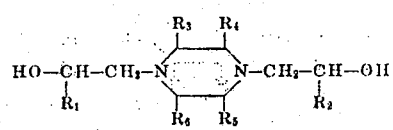

wherein $R_1$, $R_2$, $R_3$, $R_4$, $R_5$, and $R_6$ are selected from the group consisting of hydrogen and alkyl, the combined water and piperazine compound being substantially stoichiometrically equivalent to said free —N=C=O concentration.

11. In a process for preparing polyurethane compositions by reacting a monomeric organic polyisocyanate and an active hydrogen-containing organic compound selected from the group consisting of (a) polyesters which are the reaction product of a polyhydric alcohol and a member selected from the group consisting of polycarboxylic acids, anhydrides, and acid halides, (b) polyesteramides which are the reaction product of a polycarboxylic acid and a member selected from the group consisting of aminoalcohols, a polyhydric alcohol plus an amine, a polyhydric alcohol plus an aminoalcohol, and a polyhydric alcohol plus an amine plus an aminoalcohol, and (c) polyhydric alcohols, in the presence of a reaction accelerator, the improvement wherein said reaction accelerator comprises an N,N'-bis(hydroxyalkyl)piperazine, wherein the N,N'-bis(hydroxyalkyl)-piperazine has the following structural formula:

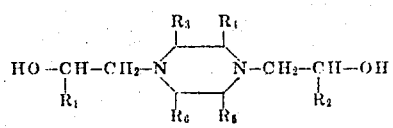

wherein $R_1$, $R_2$, $R_3$, $R_4$, $R_5$, and $R_6$ are selected from the group consisting of hydrogen and alkyl.

12. In a process for preparing polyurethane foam compositions by reacting a monomeric organic polyisocyanate, an active hydrogen-containing organic compound selected from the group consisting of (a) polyesters which are the reaction product of a polyhydric alcohol and a member selected from the group consisting of polycarboxylic acids, anhydrides, and acid halides, (b) polyesteramides which are the reaction product of a polycarboxylic acid and a member selected from the group consisting of aminoalcohols, a polyhydric alcohol plus an amine, a polyhydric alcohol plus an aminoalcohol, and a polyhydric alcohol plus an amine plus an aminoalcohol, and (c) polyhydric alcohols, and water in the presence of a reaction accelerator, the improvement wherein said reaction accelerator comprises a water-soluble N,N'-bis(hydroxyalkyl)piperazine, wherein the N,N'-bis(hydroxyalkyl)piperazine has the following structural formula:

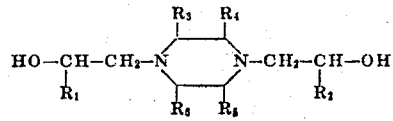

wherein $R_1$, $R_2$, $R_3$, $R_4$, $R_5$, and $R_6$ are selected from the group consisting of hydrogen and alkyl.

13. A process according to claim 12 wherein said reaction accelerator comprises N,N'-bis(2-hydroxyethyl)2-methylpiperazine.

14. A process according to claim 12 wherein said reaction accelerator comprises N,N'-bis(2-hydroxypropyl)-2-methylpiperazine.

References Cited in the file of this patent

UNITED STATES PATENTS

| 2,343,808 | Schlack | Mar. 7, 1944 |

FOREIGN PATENTS

| 700,617 | Great Britain | Dec. 9, 1953 |
| 760,744 | Great Britain | Nov. 7, 1956 |